United States Patent
Mohammad et al.

(10) Patent No.: US 10,252,638 B2
(45) Date of Patent: Apr. 9, 2019

(54) WHEELCHAIR PROPULSION METHOD, KIT, AND WHEELCHAIR IMPLEMENTING SUCH A METHOD

(71) Applicants: CENTRE NATIONAL DE LA RECHERCHE SCIENTIFIQUE, Paris (FR); UNIVERSITE DE VALENCIENNES ET DU HAINAUT CAMBRESIS, Valenciennes (FR)

(72) Inventors: Sami Mohammad, Valenciennes (FR); Thierry-Marie Guerra, Valenciennes (FR)

(73) Assignees: CENTRE NATIONAL DE LA RECHERCHE SCIENTIFIQUE (CNRS), Paris (FR); Université de Valenciennes et du Hainaut Cambresis, Valenciennes (FR)

( * ) Notice: Subject to any disclaimer, the term of this patent is extended or adjusted under 35 U.S.C. 154(b) by 165 days.

(21) Appl. No.: 15/311,769

(22) PCT Filed: May 19, 2015

(86) PCT No.: PCT/EP2015/061030
§ 371 (c)(1),
(2) Date: Nov. 16, 2016

(87) PCT Pub. No.: WO2015/177173
PCT Pub. Date: Nov. 26, 2015

(65) Prior Publication Data
US 2017/0088014 A1      Mar. 30, 2017

(30) Foreign Application Priority Data
May 19, 2014   (FR) ...................... 14 54449

(51) Int. Cl.
*B60L 11/18*       (2006.01)
*B60L 15/20*       (2006.01)
(Continued)

(52) U.S. Cl.
CPC .............. *B60L 15/20* (2013.01); *A61G 5/045* (2013.01); *A61G 5/06* (2013.01); *B60L 11/007* (2013.01);
(Continued)

(58) Field of Classification Search
CPC ......... A61G 5/045; A61G 5/06; B60L 11/007; B60L 11/1803; B60L 11/1805;
(Continued)

(56) References Cited

U.S. PATENT DOCUMENTS 6,003,624 A      12/1999   Jorgensen et al.
6,443,250 B1 *    9/2002   Kamen .................... A61G 5/04
                                                                        180/7.1
(Continued)

FOREIGN PATENT DOCUMENTS

EP       1 759 973 A1    3/2007
JP       2008-263676 A   10/2008

OTHER PUBLICATIONS

El-Hadi Guechi et al., "TS-fuzzy predictor observer design for trajectory tracking of wheeled mobile robot," 37th Annual Conference on IEEE Industrial Electronics Society, Nov. 7, 2011, pp. 319-324, XP032104458.
(Continued)

*Primary Examiner* — Khoi H Tran
*Assistant Examiner* — Robert T Nguyen
(74) *Attorney, Agent, or Firm* — Osha Liang LLP (57) ABSTRACT

A wheelchair having two drive wheels, each provided with a rotary drive motor wherein the value of the drive torque applied by each motor is controlled such as to stabilize the
(Continued)

wheelchair, while in motion on the two drive wheels and occupied by a user, in an inclined balance position.

16 Claims, 8 Drawing Sheets

(51) Int. Cl.
*A61G 5/04* (2013.01)
*A61G 5/06* (2006.01)
*B60L 11/00* (2006.01)

(52) U.S. Cl.
CPC ....... *B60L 11/1803* (2013.01); *B60L 11/1805* (2013.01); *B60L 2200/16* (2013.01); *B60L 2200/34* (2013.01); *B60L 2210/40* (2013.01); *B60L 2220/14* (2013.01); *B60L 2220/42* (2013.01); *B60L 2220/46* (2013.01); *B60L 2240/12* (2013.01); *B60L 2240/22* (2013.01); *B60L 2240/32* (2013.01); *B60L 2240/421* (2013.01); *B60L 2240/423* (2013.01); *B60L 2240/427* (2013.01); *B60L 2240/429* (2013.01); *B60L 2240/461* (2013.01); *B60L 2250/12* (2013.01); *B60L 2250/16* (2013.01); *B60L 2250/18* (2013.01); *B60L 2250/24* (2013.01); *B60L 2260/26* (2013.01); *B60L 2260/34* (2013.01); *B60L 2270/40* (2013.01); *B60W 2300/38* (2013.01); *B60Y 2200/84* (2013.01); *Y02T 10/645* (2013.01); *Y02T 10/646* (2013.01); *Y02T 10/7005* (2013.01); *Y02T 10/7241* (2013.01); *Y02T 10/7275* (2013.01)

(58) Field of Classification Search
CPC .. B60L 15/20; B60L 2200/16; B60L 2200/34; B60L 2210/40; B60L 2220/14; B60L 2220/42; B60L 2220/46; B60L 2240/12; B60L 2240/22; B60L 2240/32; B60L 2240/421; B60L 2240/423; B60L 2240/427; B60L 2240/429; B60L 2240/461; B60L 2250/12; B60L 2250/16; B60L 2250/24; B60L 2260/26; B60L 2260/34; B60L 2270/40; B60Y 2200/84; Y02T 10/645; Y02T 10/648; Y02T 10/7005; Y02T 10/7241; Y02T 10/7275
See application file for complete search history.

(56) References Cited

U.S. PATENT DOCUMENTS

| | | | |
|---|---|---|---|
| 2001/0001992 A1* | 5/2001 | Morrell | A61G 5/04 180/8.1 |
| 2001/0020556 A1* | 9/2001 | Kamen | A61G 5/04 180/282 |
| 2002/0121394 A1* | 9/2002 | Kamen | A61G 5/061 180/41 |
| 2003/0226698 A1 | 12/2003 | Kamen et al. | |
| 2005/0211477 A1* | 9/2005 | Gray | A61G 5/045 180/41 |
| 2007/0055424 A1* | 3/2007 | Peters | A61G 5/04 701/36 |
| 2007/0073425 A1* | 3/2007 | Nakashima | B62K 3/00 700/71 |
| 2011/0276233 A1* | 11/2011 | Lofstrand | A61G 5/04 701/49 |
| 2015/0061240 A1* | 3/2015 | Segawa | A61G 5/107 280/5.28 |
| 2017/0088014 A1* | 3/2017 | Mohammad | A61G 5/045 |

OTHER PUBLICATIONS

Y. Takahashi et al., "Front wheel raising and inverse pendulum control of power assist wheel chair robot," The 25th Annual Conference of the IEEE Industrial Electronics Society, vol. 2, Nov. 1999, pp. 668-673, XP010366687.

* cited by examiner

WHEELCHAIR PROPULSION METHOD, KIT, AND WHEELCHAIR IMPLEMENTING SUCH A METHOD

CROSS-REFERENCE TO RELATED APPLICATIONS

This application is a National Stage of International patent application PCT/EP2015/061030, filed on May 19, 2015, which claims priority to foreign French patent application No. FR 1454449, filed on May 19, 2014, the disclosures of which are incorporated by reference in their entirety.

FIELD OF THE INVENTION

The present invention relates to a wheelchair propulsion method. It relates also to a kit implementing such a method for equipping a wheelchair, and an electric wheelchair implementing this method. The invention is applied notably to improve the mobility of wheelchairs on all types of terrains.

BACKGROUND

There are various types of wheelchairs on the market, from the simplest in a manual version to the most sophisticated in an all-electric version. Faced with the difficulties encountered in everyday life, many people with reduced mobility are abandoning the manual wheelchair. In effect, these wheelchairs require a significant physical effort on the part of the users and are not always easy to maneuver, ultimately limiting the independence of the people. The latter must then choose from all the wheelchairs available on the market notably according to their handicap, their physical capabilities and their financial means.

One solution for allowing these people to restore greater independence is to use an all-electric wheelchair equipped with a control member. From this control member, the user can drive the wheelchair in all directions, the wheelchair being propelled by means of an electric motor, hand rails coupled to the wheels being moreover always provided to allow manual activation, notably in case of unavailability of the electric propulsion. Another solution, less costly, consists in equipping a conventional wheelchair with an additional motor-drive kit.

Even for a wheelchair with electric propulsion, whether-electric or equipped with an electric motor-drive kit, there are still situations in which the propulsion and the mobility of the wheelchair is difficult, even hazardous, for the person who is seated in the wheelchair. Such is typically the case when a wheelchair has to be moved around outside of a flat, stable and even ground. In particular, grassy terrains or terrains covered with protrusions are very difficult, even impossible to cover. The crossing of obstacles such as sidewalk edges are often difficult to manage with a risk of toppling of the wheelchairs. The crossing of ground with slopes, such as ramps or cambers of roads for example, are particularly difficult with a very significant risk of toppling of the wheelchairs to the extent that most users forego crossing them without help from one or more third parties.

SUMMARY OF THE INVENTION

One aim of the invention is notably to enable wheelchairs with electric propulsion to move around in all types of terrains and notably in the types of terrains described above. To this end, the subject of the invention is a wheelchair propulsion method, said wheelchair having two drive wheels each with a rotational drive motor, the value of the drive torque applied by each motor being automatically controlled to perform a gyroscopic stabilization of said wheelchair when in motion on the two drive wheels, loaded with a user, in an inclined position of equilibrium $\psi_0$.

In one possible implementation, to automatically control the value of the motor torque of each wheel, said method uses a direct model defined by the following equation, for the system consisting of said loaded wheelchair and the motors:

$$\dot{x}(t) = \sum_{i=1}^{Q} h_i(z(t))[A_i x(t) + B_i u(t)]$$

$$y(t) = \sum_{i=1}^{Q} h_i(z(t))C_i x(t)$$

in which x is a state vector, a function of time, such that:

$$x = [\theta \, \dot{\omega} \, \dot{\theta} \, \dot{\psi}]^T$$

z (t) being dependent, linearly or not, on the state variables x(t) or external parameters such as, notably, the weight, the inertia or the geometry;
y(t) being the outputs to be controlled;
u being the control input influencing the components of the state vector x;
θ being equal to ½ ($\theta_R + \theta_L$), $\theta_R$ and $\theta_L$ being, respectively, the angles of rotation of the right wheel and of the left wheel relative to a given origin;
ψ being the angle of deviation of the wheelchair relative to the position of equilibrium $\psi_0$;
the non-linear functions $h_i(z(t))$, the matrixes $A_i$, $B_i$, z ∈ {1, . . . , Q} depending on the geometrical and mechanical parameters of said system, the number Q depending directly on the number of non-linearities taken into account in the model.

This model notably makes it possible to describe the different modes of operation, namely:
the two-wheel mode
the four-wheel mode
the third party assistance mode.

The control law not only guarantees stability, performance and robustness in each of these modes, but must also guarantee a reliable transition (obviously controlled, but all smooth) between the different modes: two wheels versus four wheels, four wheels versus two wheels, two wheels or four wheels or versus assistance and assistance versus two wheels or four wheels.

According to the particular implementations, the control signals can be:

$$u = [\Gamma_l \Gamma_r]^T$$

$\Gamma_l, \Gamma_r$ being, respectively, the values of the torques applied by the left and right motors.

In other possible implementations, the control input u has the speeds of the drive wheel for components or the control input u has the control voltages applied to the motors for components.

The method uses, for example, a static and/or dynamic non-linear state feedback. In this case, an observer of the state of variables not measured or an estimator of the disturbance inputs is for example added, this state feedback being defined by the following equation:

$$u(t) = N\theta_{ref} + \sum_{i=1}^{R'} h_i(z(t))K_i x(t)$$

$\theta_{ref}$ being the integral relative to time of the rotation speed setpoint of said drive wheels;

the gains that appear here, N and $K_i$, $i \in \{1, \ldots, R'\}$, ensuring the stability, the robustness and the performance levels of the system as well as the transition between the different modes; they can be determined using advanced automation techniques, for example Linear Matrix Inequalities, $H_2$, $H_\infty$ syntheses, the so-called grand gain techniques, the algebraic methods in particular.

The angle of deviation $\psi$ is for example measured on the basis of an angle of inclination value $\psi_{gyr}$ measured by a gyroscope mechanically secured to said wheelchair, said angle of deviation $\psi$ being the difference between the gyroscopic measurement of the inclination $\psi_{gyr}$ and an estimated value of the angle of equilibrium $\psi_0$, said estimated value of the angle of equilibrium being a function of the geometrical and dynamic parameters of said loaded wheelchair.

Another subject of the invention is an electric propulsion kit suitable for kitting out a wheelchair comprising two drive wheels, said kit comprising at least:

two motors that can each be fixed to a drive wheel;

a gyroscope for measuring the angle of inclination of the wheelchair;

a central processing unit delivering a signal for controlling the value of the drive torque of each of the motors, said central processing unit comprising a computer capable of executing a so-called two-wheel automatic control, on the basis of a control signal, implementing the propulsion method described previously, to stabilize said wheelchair when in motion on the two drive wheels, loaded with a user, in an inclined position of equilibrium $\psi_0$. From a signal to deactivate said two-wheel automatic control, the central processing unit generates, for example, motor torque values creating an acceleration of the drive wheels backward for a determined time, forcing the wheelchair to tilt forward and to rest on its front wheels. A control interface generates, for example, a signal to activate and deactivate said two-wheel automatic control. The control interface is for example of the "joystick" type or is a screen making it possible to navigate in a menu.

A signal activating said two-wheel automatic control is for example generated by a backward tilting movement of said wheelchair, said movement being sensed by the gyroscope. In another possible embodiment, the signal deactivating said two-wheel automatic control is generated by a forward tilting movement of said wheelchair, said movement being sensed by the gyroscope.

In another possible configuration, the motor-drive kit is mounted on a transport equipment item such as a stretcher, carriage, a bed or similar, to allow the user, who, in this case, has his or her driving capabilities, a maneuverability and ease of transportation of heavy loads. With the two-wheel mode being set by the control, it is sufficient for the user (the third party in the case of a wheelchair) to tilt the device forward to advance or backward to reverse. To turn the transport equipment, there are two possibilities:

by tilting the equipment item, the user exerts a force on one side of the equipment item to prevent it from advancing, thus forcing it to turn to this side;

or the kit is supplied with a control device like a small lever making it possible to control the movement to the left and to the right of the equipment item.

Yet another subject of the invention is an electric wheelchair comprising two drive wheels each driven by an electric motor, said wheelchair comprising at least:

a gyroscope for measuring the angle of inclination of said wheelchair;

a central processing unit delivering a signal to control the value of the drive torque of each of the motors, said central processing unit comprising a computer capable of executing a so-called two-wheel automatic control, on the basis of a control signal, implementing the propulsion method described previously, to stabilize said wheelchair when in motion on the two drive wheels, loaded with a user, in an inclined position of equilibrium $\psi_0$.

On the basis of a signal deactivating said two-wheel automatic control, the central processing unit generates, for example, motor torque values creating an acceleration of the drive wheels backward for a determined time, forcing the wheelchair to tilt forward and to rest on its front wheels. In a possible embodiment, said wheelchair comprises a control interface generating a signal activating and deactivating said two-wheel automatic control, said interface being, for example, of the "joystick" type or being, for example, a screen making it possible to navigate in a menu. A signal activating said two-wheel automatic control is for example generated by backward tilting movement of said wheelchair, said movement being sensed by the gyroscope. A signal deactivating said two-wheel automatic control is for example generated by a forward tilting movement of said wheelchair, said movement being sensed by the gyroscope.

BRIEF DESCRIPTION OF THE DRAWINGS

Other features and advantages of the invention will become apparent from the following description given in light of the attached drawings which represent.

DETAILED DESCRIPTION

Figure 1:
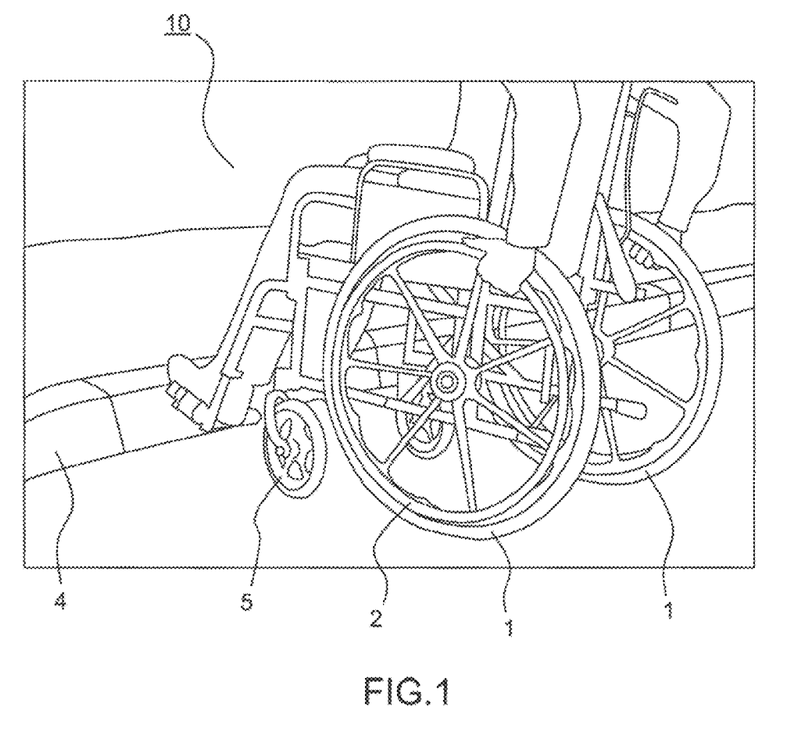
FIG. 1, a person moving around in a wheelchair.

FIG. 1 represents a person moving around in a manual wheelchair. The person controls the movement of the wheelchair by a forward or backward circular thrust on the handrail 2 coupled to each drive wheel 1, driving the rolling of these wheels. Two small wheels 5 situated at the front complete the four-wheel device to ensure the stability of the wheelchair on the ground, the latter which are free to rotate about a vertical axis assist the user of the wheelchair in steering.

An electric propulsion assistance device makes it possible to reduce or eliminate these physical efforts. One such device comprises two electric motors, a motor being coupled to each wheel to drive it in rotation. The motors used can be of the brushless motor type. Other types of motors can also be used, notably direct current motors. The motor torque delivered by a motor can be a function of the drive movement applied to the hand rail 2. In this case, several solutions are possible for detecting the propulsion torque then produced by the user and controlling the drive motors as a function of this applied torque. Another solution for controlling the drive motors of the wheels consists in using a control member such as a lever for example, so-called "joystick", fixed to the frame of the wheelchair and more particularly to the armrest to facilitate the manipulation thereof by the user. The lever thus makes it possible to control the motors forward or backward, to set the wheel drive speed of the wheels, and to turn to the left or to the right by activating one or other of the motors. The electric propulsion works perfectly on even grounds. The electric propulsion devices according to the prior art in effect make it possible for the users of wheelchairs to move around easily in interiors, provided that there is the necessary space and that there are no excessive level differences. They also make it possible to move around easily on sidewalks or flat roads.

The same does not apply when the passage ways become uneven, or present obstacles. FIG. 1 illustrates a first example of an obstacle. In this example, the user has to cross the edge of a sidewalk 4 to climb onto it. The user then has to execute a reverse movement to raise off the wheelchair, which requires a physical effort with a risk of the wheelchair completely toppling over backward.

Figure 2:
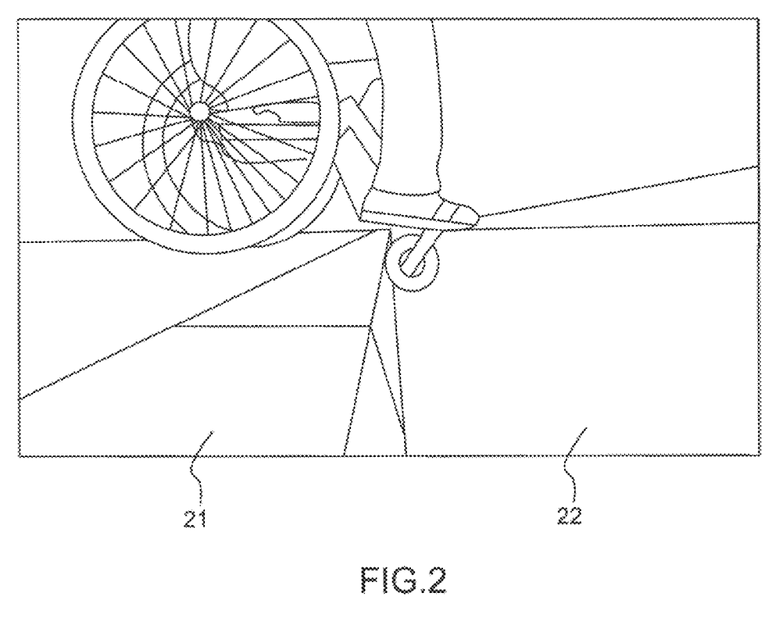
FIG. 2, a person in a wheelchair crossing a first type of obstacle.

FIG. 2 presents another case of crossing an obstacle in which the user moves from a sidewalk 21 to a roadway 22. In this case, the user has to be careful not to topple forward and over turn.

Figure 3:
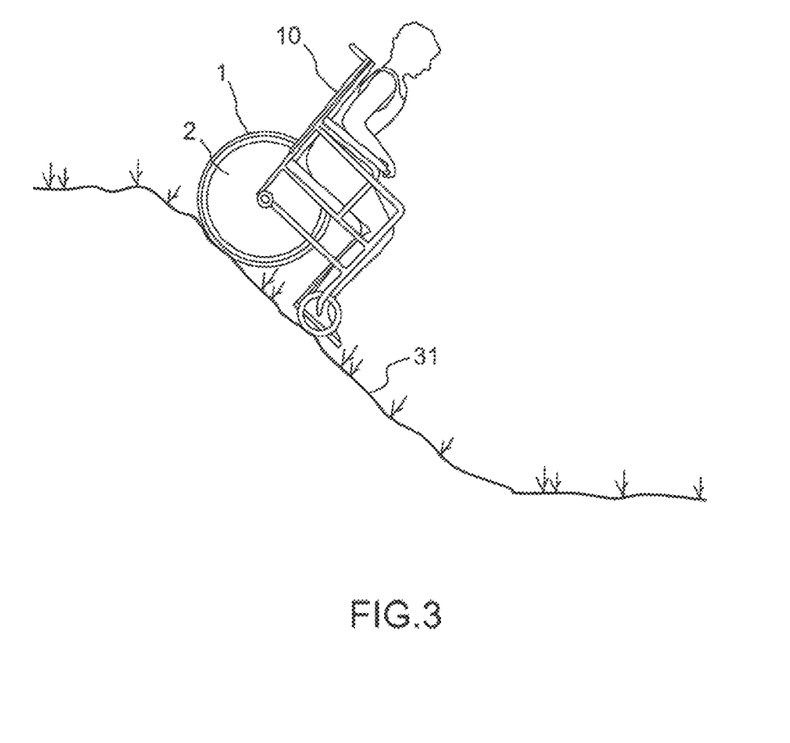
FIG. 3, a person in a wheelchair crossing a second type of obstacle.

FIG. 3 presents another difficult situation in which a user has to descend a ramp with his or her wheelchair 10. Even though the braking system of the wheelchair makes it possible to control the speed of descent, there is a significant risk of the user toppling forward or of at least feeling a sense of fear such that he or she refuses to descend the ramp.

Figure 4:
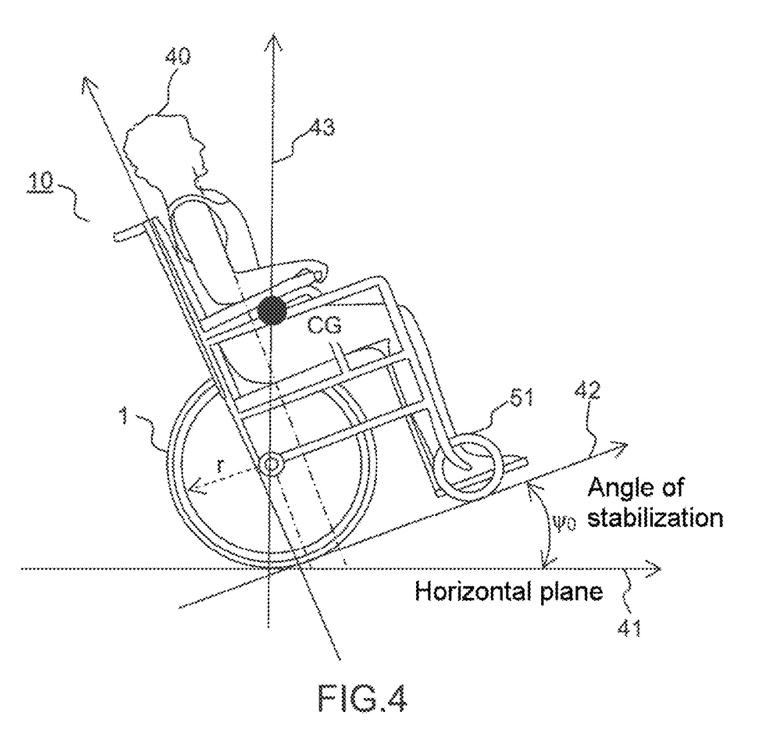
FIG. 4, an illustration of the principle of propulsion of a wheelchair according to the invention.

FIG. 4 illustrates the principle of implementation of the invention. To allow the wheelchair to move around in all circumstances, for example to cross obstacles of the type of those of FIGS. 1, 2 and 3, and more generally to move around on uneven or unstable grounds, the invention provides a mode of operation hereinafter called "two-wheel" mode in which the wheelchair 10 moves around only on the two drive wheels 1, in an inclined position of equilibrium. In this configuration, the wheelchair can move around more easily on uneven or unstable grounds, on slopes and can more easily cross obstacles. The wheelchair is kept in this "two-wheel" mode by the torques applied to the drive wheels 1 by their drive motor.

FIG. 4 presents the wheelchair loaded with a user in position of equilibrium about an angle of stabilization $\psi_0$, the user moving around on a horizontal plane. This angle is formed between the horizontal plane 41 and the plane 42 containing the four wheels 1, 5 of the wheelchair, more particularly its plane 42 corresponds to a hypothetical plane supporting the four wheels.

According to the invention, a motor torque $\Gamma_l$ is applied to the left wheel and a motor torque $\Gamma_r$ is applied to the right wheel, the values of which make it possible to obtain the speed and the angle of stabilization $\psi_0$ according to an automatic control which will be described hereinbelow. The speed of movement of the wheelchair corresponds to the speed of rotation of the drive wheels 1, and different speeds of rotation between the wheels make it possible for the wheelchair to turn to the right or to the left.

The torque values to be applied depend on the geometrical and dynamic parameters of the loaded wheelchair, on the desired drive wheel speeds and on the angle of stabilization $\psi_0$. This angle of stabilization, or of equilibrium, is the angle of inclination of the wheelchair for which the center of gravity CG of the whole formed by the wheelchair 10 and the user 40 encounters the vertical axis 43 passing through the axis of the drive wheels 1. In practice, this angle is of the order of 20° to 30°, which makes it possible to cross the standard obstacles of the sidewalk edge or staircase tread type and offers an inclination of the wheelchair relative to the horizontal that is comfortable for the user.

In "four-wheel" mode, the wheelchair moves around on its four wheels 1, 5, to compute the drive torques to be applied to the drive wheels, the following parameters are taken into account:

m, the weight of the loaded wheelchair, that is to say loaded with the user;

r, the radius of the drive wheels 1;

L, the distance between the center of gravity and the axis of the wheels;

J, the inertia relative to the axis of the wheels;

f, the coefficient of friction of the wheels.

The equations of the movement of the wheelchair can be obtained by applying the conventional laws of mechanics, $\theta_R$, $\theta_L$ being, respectively, the angles of rotation of the right wheel and of the left wheel relative to a given angular origin, $\Gamma_R$ and $\Gamma_L$ being, respectively, the drive torques exerted on the right and left wheels, a drive torque being the sum of the torque applied by the electric motor of the wheel and of the drive torque exerted by the user on the wheel. In energy terms, by defining: the kinetic energy:

$$E_c = \tfrac{1}{2} m r^2 (\dot{\theta}_R^2 + \dot{\theta}_L^2) + \tfrac{1}{2} J (\dot{\theta}_R^2 + \dot{\theta}_L^2);$$

the potential energy:

$$E_p = mg(r + L \cos \psi);$$

and the generalized variables:

$$q^T = [\theta_L \theta_R \psi];$$

it is possible to describe the complete nonlinear model, including the frictions, on the basis of the Lagrange equations:

$$H(q)\ddot{q} + F(q,\dot{q})\dot{q} + G(q) = Qu$$

H (q) being the bit matrix, F (q,$\dot{q}$) including the friction coefficients of f and G(q) representing the gravity matrix.

From this very general modeling which takes into account all the nonlinearities of the system, it is possible to extract therefrom exact models in the desired compact of the state space (which therefore represents all the field of operation of the system), either nonlinear or set in polytopic forms (called quasi-LPV), for example: I.

$$\dot{x}(t) = \sum_{i=1}^{Q} h_i(z(t))[A_i x(t) + B_i u(t)]$$

$$y(t) = \sum_{i=1}^{Q} h_i(z(t)) C_i x(t)$$

In this case, the nonlinearities are included in the interpolation functions $h_i(z(t))$. In this model, the state vector x(t)

includes at least the variables of angle of inclination of the wheelchair, the angle of the wheels and their derivatives. For example:

$$x=[\theta \psi \dot\theta \dot\psi]^T$$

$\theta$ being equal to $\frac{1}{2}(\theta_R+\theta_L)$, $\theta_R$ and $\theta_L$;

$\psi$: being the angle of deviation of the wheelchair relative to the position of equilibrium $\psi_0$.

The functions $h_i(z(t))$ being nonlinear functions. These functions and the matrixes $A_i$, $B_i$, $i \in \{1, \ldots, Q\}$ depend on the geometric and mechanical parameters of the system, the number Q being the number of nonlinearities taken into account in the model.

The state vector x(t) can contain additional terms, such as estimations of disturbances. z(t) is dependent, linearly or not, on the state variables x(t) or external parameters such as, notably, the weight, the inertia or the geometry of the system.

The angle $\psi$ is for example measured by a gyroscope mechanically secured to the frame of the wheelchair.

The wheelchair in "two-wheel" position can advantageously be driven by a control member of the joystick type with no other movements on the part of the user who can remain comfortably seated in his or her wheelchair.

Figure 5:
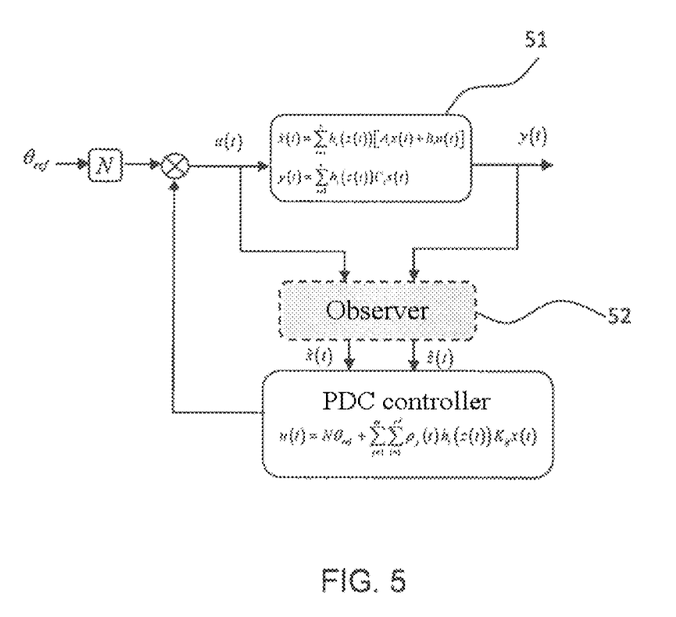
FIG. 5, an illustration of a possible automatic control.

FIG. 5 illustrates the automatic control loop of the system for guaranteeing operation in all the modes, in "two-wheel" position in equilibrium with a desired movement speed, "four-wheel" mode, "assistance" mode and the transitions between these modes. The movement setpoints are only given by the control, a joystick for example. This automatic control loop with the gyroscope and the suitable interfaces constitutes the system for stabilizing the wheelchair in "two-wheel" position, or mode, in "assistance mode" and the transition between the modes. The automatic control loop is implemented by a program, called gyroscopic stabilization program, activated or deactivated by an external control signal.

In this case, the control transmits a setpoint of rotation speed of the wheels $\dot\theta_{ref}$ and of rotation angle in the horizontal plane $\Phi_{ref}$. The speed setpoint is integrated relative to time and thus transformed into rotation angle setpoint $\theta_{ref}$.

FIG. 5 illustrates more specifically the automatic control of angle of rotation of the wheels $\theta$, in which $\theta=\frac{1}{2}(\theta_R+\theta_L)$.

In this automatic control 51, the deviation of the center of gravity of the wheelchair CG relative to its position of equilibrium is considered to be a disturbance to be rejected.

The control law is computed on the basis of a nonlinear model described previously by taking into account the different modes of operation. In particular, the setting to two-wheel mode and the resetting to four-wheel mode involves nonlinear terms which are no longer compatible with a linearization valid only for small angles. The control law implemented, not only advantageously allows these four-wheel relative to two-wheel and two-wheel relative to four-wheel transitions, but also propulsion by an assistant, a third party, who modifies the behavior of the equilibrium and must therefore be taken into account. Naturally the changes of mode between two and/or four wheels and to the assistant are taken into account in a secure manner and smoothly in both directions.

The control law can be either nonlinear, of the Parallel Distributed Compensation type for example:

$$u(t) = N\theta_{ref} + \sum_{i=1}^{R'} h_i(z(t))K_ix(t)$$

or with switchovers:

$$u(t) = N\theta_{ref} + \sum_{j=1}^{M}\sum_{i=1}^{R'} \rho_j(t)h_i(z(t))K_{ij}x(t)$$

in which $\rho_j(t)$ represents the mode of operation or the transition between the modes: two-wheel relative to four-wheel, four-wheel relative to two-wheel, two-wheel or four-wheel; $\theta_{ref}$ is the integral relative to time of the speed of rotation setpoint of said drive wheels (1);

the gains that appear here, N and $K_{ij}$, $i \in \{1, \ldots, R'\}$ ensure the stability, the robustness and the performance levels of the system as well as the transition between the different modes.

The gains that appear here, N and $K_{ij}$, $i \in \{1, \ldots, r'\}$, ensure the stability, the robustness and the performance levels of the system as well as the transition between the different modes.

In addition, these laws can comprise a state observer 52 making it possible to reconstruct non-measured variables and/or estimate external disturbances. In this case, x(t) and/or z(t) are replaced respectively by their estimate $\hat{x}(t)$ and $\hat{z}(t)$. The synthesis of these correctors, plus the observations if appropriate, notably in the advanced automation techniques, for example Linear Matrix Inequalities, the $H_2$, $H_\infty$, syntheses, the so-called grand gain techniques, the algebraic methods. In all cases, they make it possible to give proofs of stability and of robustness in all the modes of operation while in addition guaranteeing energy and time-related performance levels and transitions between the modes that are safe and comfortable for the user, and smooth.

For all these functionalities, including keeping the wheelchair in "two-wheel" position of equilibrium, a device according to the invention uses a control loop, that is to say an automatic control. FIG. 5 illustrates one possible example of automatic control, in which the system is controlled in rotation speed, itself integrated as angle setpoint.

It is also possible to enslave the system to motor torque setpoints. It is also possible to take for automatic control setpoint the control voltage to the drive motors of the wheels. The angle of equilibrium $\psi_0$ is determined a priori. In all cases, the automatic control system is capable of compensating any possible difference in the system resulting from the change of position of equilibrium due to the movements of the user, the state of the road or even the drift of the sensors.

This equilibrium value corresponds to an inclination of the wheelchair where the center of gravity CG encounters the vertical axis 41 passing through the axis of the drive wheels 1. This angle $\psi_0$ can therefore be estimated a priori. Knowing the mechanical and dimensional parameters of the wheelchair, it is possible to reliably compute the coordinates of the center of gravity CG in a reference frame linked to the wheelchair, by retaining an average weight and a standard morphology for the user. If need be, the coordinates of the center of gravity can be computed beforehand as a function of the weight and of the morphology of the user.

The activation of the "two-wheel" mode can be done on the flat by the user in the simplest possible manner, by activating a control such as a knob or by browsing in a menu. A setpoint for initializing the automatic control of the "two-wheel" mode is then sent to the gyroscopic stabilization program. There are several ways of arriving at the position of equilibrium. In a first mode, it is a third party that tilts the wheelchair. In a second mode, the equilibrium maneuver is performed in an automated manner provided that there is the space necessary and the user observes a certain number of setpoints.

The system is programmed to revert to the "four-wheel" position at any moment, notably if there is the slightest risk for the user. The transition to the "four-wheel" position is simple. The stabilization program is stopped and a sequence for return to the horizontal is applied. This involves applying a significant acceleration to the two motors in reverse for a determined time, which forces the wheelchair to tilt forward and to rest on the front wheels 5. It is also possible to apply this sequence for return to the horizontal before stopping the stabilization program and to program this algorithm to stop the signal if the angle $\psi$ becomes too great. It is also possible for a third party to stop the "two-wheel" mode by holding the wheelchair.

A movement to tilt the wheelchair forward, generated by a third party or by the user, via the handrails 2, generates the deactivation of the automatic control of the two-wheel mode. This tilting movement is detected by the gyroscope. An abrupt change of inclination forward is then interpreted as a signal to deactivate the two-wheel mode.

Similarly, a tilting of the wheelchair backward, provoked by a third party or by the user, detected by the gyroscope, is interpreted as a signal to activate the two-wheel mode.

Figure 6:
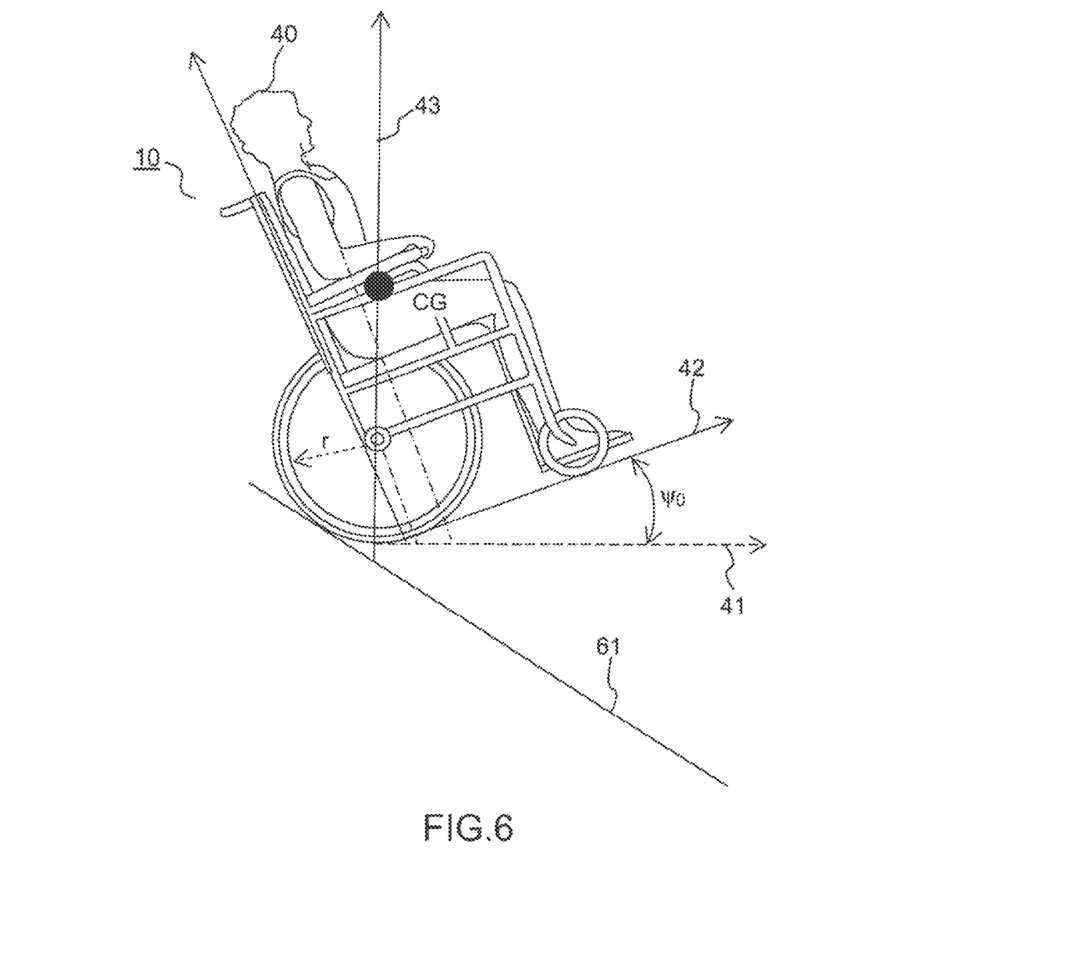
FIG. 6, an illustration of a propulsion according to the invention on a sloping track.

FIG. 6 presents an example of use of a "two-wheel" mode in which the user and his or her wheelchair descend a ramp 61, for example an embankment or a lane with a slope. The torques driving the wheels are always controlled so as to keep the wheelchair in equilibrium, that is to say by keeping the center of gravity CG on the vertical axis 43 passing through the axis of the wheels, the inclination of the wheelchair being stabilized about the angle of equilibrium $\psi_0$ relative to the horizontal 41. Advantageously, the user descends the slope 51 on his or her wheelchair in total safety, with no risk of toppling forward.

Another advantage of the "two-wheel" mode is also a better drivability, in particular for the changes of direction given that the ground contact surface is reduced, since it rests on two wheels instead of four wheels for a conventional wheelchair. The change of direction is made by acting on the motor torques to obtain the angle of orientation $\Phi$ in accordance with the above equations.

The invention can be implemented in kit form for kitting out manual wheelchairs or directly kit out an all-electric wheelchair, but also to kit out rolling systems such as transport equipment items, notably for people, such as a stretcher, a carriage or a bed for example. Hereinafter in the description, the kit is applied to a wheelchair.

The kit comprises at least the following elements, which can be dismantled in a kit version and form an integral part in an all-electric wheelchair version:

two motors that can each be fixed to a drive wheel 1,
a gyroscope for measuring the angle of inclination of the wheelchair relative to the horizontal, the gyroscope being fixed to the frame of the wheelchair;
a control interface;
a central processing unit notably incorporating processing means for implementing the stabilization program for the "two-wheel" mode, but also computations of motor torques to be applied for the "four-wheel" mode and for computing and generating the control signal for the motor torques.

The motors are for example of the brushless or direct current motor type.

The kit also comprises a battery supplying the electrical energy to the motors and the central processing unit. Conventionally, an inverter that is not represented is coupled to each motor to transform the direct voltage supplied by the battery into alternating voltage. This inverter can be placed at the level of the motors or at the level of the battery support in the case of use of a "brushless" type motor.

The control interface is, for example of the joystick or any manual control member type. The control interface can also take the form of a navigate within a menu, notably offering the transition to the two-wheel mode.

This control member sends a signal to the central processing unit containing control or mode information. This signal can in effect contain the "two-wheel" mode information, in which case the central processing unit activates the stabilization algorithm. The control signal can also be information stopping the "two-wheel" mode, or information on speed or rotation to the right or to the left in particular.

Based on the signals received, the central processing unit activates or deactivates the stabilization program, or sends a torque control to each motor.

The central processing unit also receives the angle measurement information $\psi_{gyr}$ supplied by the gyroscope, this information being used as one of the stabilization program input signals. More particularly, knowing the estimated value $\psi_0$ of the angle of equilibrium, the value $\psi$ of the angle of inclination relative to this angle of equilibrium is obtained by the relationship:

$$\psi = \psi_{gyr} - \psi_0.$$

It is this angle value $\psi$ which is used, as input variable, to control the inclined wheelchair about the position of equilibrium.

As indicated previously, the central processing unit comprises computation means for computing the motor torques to be applied that make it possible to obtain the speed of movement of the wheelchair and to stabilize the inclination of the wheelchair about the angle of equilibrium $\psi_0$, these computation means implementing the stabilization program. This automatic control involves advanced automation techniques according to the knowledge of those skilled in the art.

As indicated previously, conventionally, the drive motors of the wheels can be automatically controlled in torque, speed or voltage as a function of the angle of inclination, or of rotation, of the wheelchair relative to the horizontal, this angle being computed using the gyroscope.

One and the same housing that can be fixed to the frame of the wheelchair can contain the gyroscope and the central processing unit, which is implemented with digital and analogue circuits on one or more boards. The central processing unit comprises the circuits necessary for the computations, possibly means for interfacing with the equipment items to be controlled, notably the motors. The interface means include, for example, amplifiers for amplifying the low-level signals and analogue-digital or digital-analogue conversion circuits for processing the signals received and sending the control signals.

The kit must also make it possible to allow the user to move around according to a conventional mode, on all four wheels, with assisted propulsion. In this case, the motor torque computation means do not process the inclination. The computation algorithm can be the same as in the "two-wheel" mode, the angle $\psi_0$ being taken to be equal to 0.

The changeover from the conventional propulsion to the "two-wheel" mode can be obtained by a control, for example a switch, or by browsing in a menu as indicated previously.

Furthermore, the control law implemented allows these four-wheel transitions relative to two-wheel and two-wheel relative to four-wheel transitions but also propulsion by an assistant. Naturally, the changes of mode between two- and/or four-wheel and assistance by the assistant are taken into account safely and smoothly in both directions.

In the case where the "two-wheel" mode is provided to be installed on an all-electric wheelchair, a few adaptations are necessary to incorporate this new mode of operation in an existing solution. A gyroscope must be added to measure the angle of inclination of the wheelchair and computation and interface means must be implemented making it possible to carry out the stabilization program.

The invention has been described for a wheelchair comprising four wheels, including two drive wheels. The invention can of course be applied to a wheelchair comprising a different number of wheels. In particular, the invention applies to a wheelchair having at least three wheels including two drive wheels. The "four-wheel" mode described previously is then in this case an "all-wheels" mode. This "all-wheels" mode corresponds to the naturally stable position and mode of movement of the wheelchair, in particular when it rests on all its wheels, the "two-wheel" mode being a position which is not naturally stable and which is maintained by virtue of the automatic control.

Figure 7:
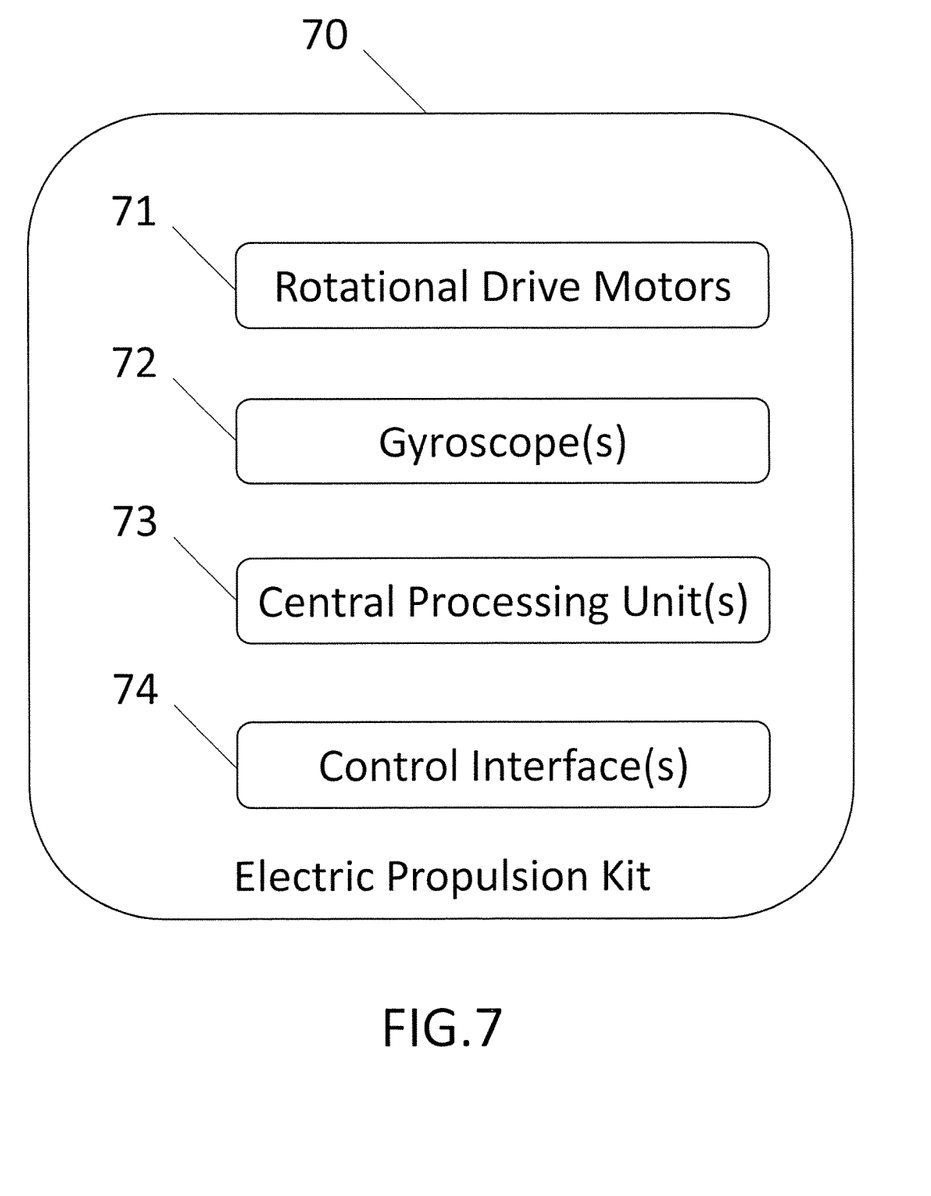
FIG. 7, a block diagram of an electric propulsion kit according to the invention.

FIG. 7 is a block diagram of an electric propulsion kit 70 according to the invention. As described in detail with reference to the embodiments above, those of skill in the art will readily appreciate that electric propulsion kit 70 includes one or more rotational drive motors 71, one or more gyroscopes 72, one or more central processing units (CPU) 73, and one or more control interfaces 74. The elements of the electric propulsion kit 70 interact with a wheelchair, as described in detail with reference to the embodiments above, to propel the wheelchair.

Figure 8:
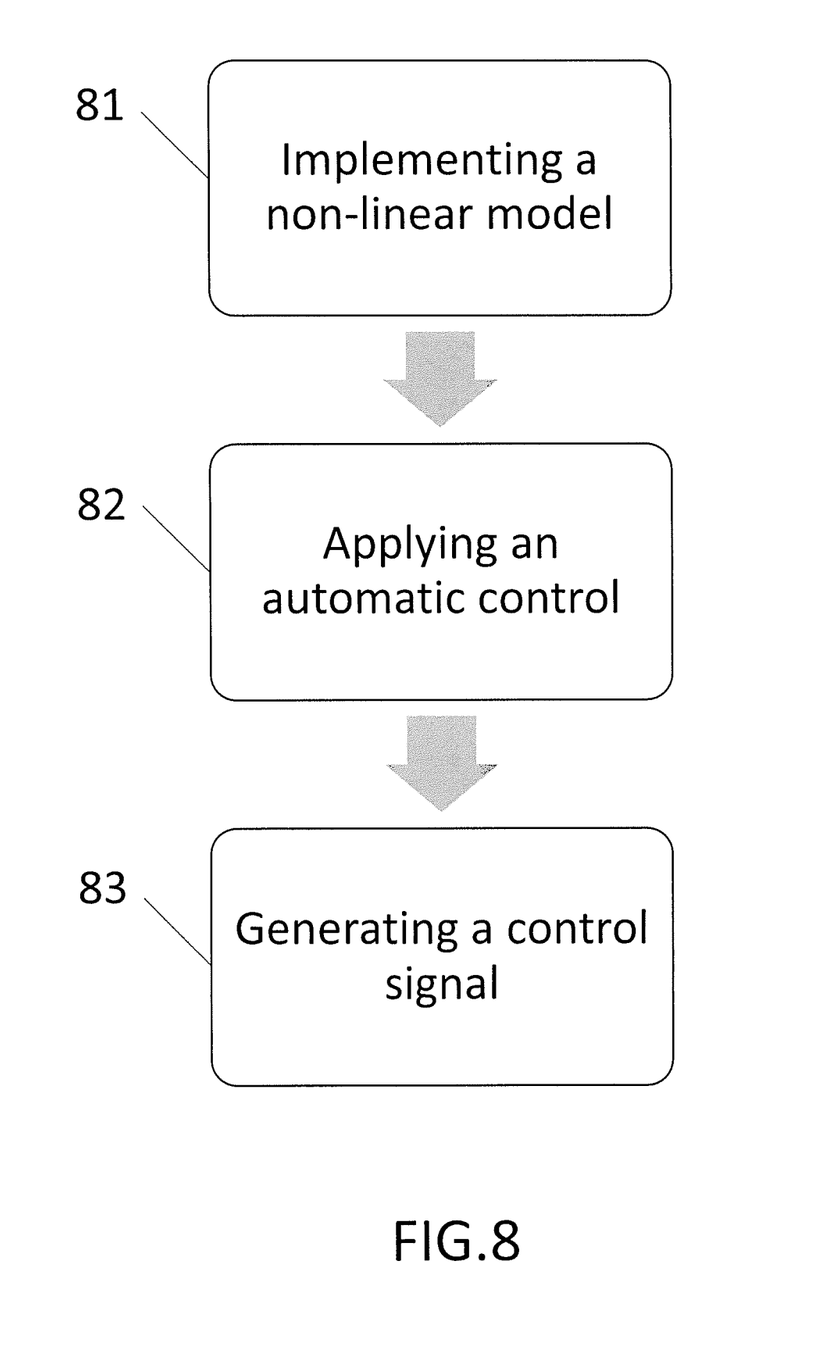
FIG. 8, a flow diagram of a method according to the invention.

FIG. 8 is a flow diagram of a method according to the invention. As described in detail with reference to the embodiments above, those skilled in the art will readily appreciate that the method according to the invention involves implementing a non-linear model (step 80), applying an automatic gain control (step 81), and generating a control signal (step 82).

The invention claimed is:

1. A method for propelling a wheelchair, wherein said wheelchair comprises at least three wheels of which two are drive wheels, wherein said drive wheels are each equipped with a rotational drive motor, wherein said method comprises
implementing a non-linear model of the wheelchair defined with respect to at least two propulsion modes comprising a first propulsion mode in which the wheelchair is propelled on all wheels in contact with the ground and a second propulsion mode in which the wheelchair is in motion on the two drive wheels in an inclined position of equilibrium;
applying an automatic control by which a value of a voltage applied to each rotational drive motor is automatically controlled by using said non-linear model to perform a gyroscopic stabilization of said wheelchair when the wheelchair is in the second propulsion mode;
generating a control signal for activating or deactivating the second propulsion mode;
wherein the non-linear model is defined for a system comprising the wheelchair and the rotational drive motors by the following equations:

$$\dot{x}(t) = \sum_{i=1}^{Q} h_i(z(t))[A_i x(t) + B_i u(t)]$$

$$y(t) = \sum_{i=1}^{Q} h_i(z(t)) C_i x(t)$$

in which x is a state vector such that:

$$x = [\theta \psi \dot{\theta} \dot{\psi}]^T,$$

z (t) being dependent, linearly or not, on the state vector x and/or on external parameters;
y (t) representing outputs to be controlled;
u being a control input influencing components of the state vector x;
θ being equal to ½ ($\theta_R + \theta_L$), $\theta_R$ and $\theta_L$ being respectively angles of rotation of a right wheel and of a left wheel relative to a given origin;
ψ: being an angle of deviation of the wheelchair relative to a position of equilibrium $\psi_0$;
functions $h_i(z(t))$ and matrixes $A_i$, $B_i$, i∈{1, . . . , Q} depending on geometrical and mechanical parameters of said system, wherein a number Q is a number of non-linearities taken into account in the model,
wherein the control input u represents the voltage applied to each rotational drive motor.

2. The method as claimed in-claim 1, further comprising implementing static and/or dynamic state feedback defined by the following equation:

$$u(t) = N\theta_{ref} + \sum_{j=1}^{M} \sum_{i=1}^{R'} \rho_j(t) h_i(z(t)) K_{ij} x(t)$$

$\rho_j(t)$ representing a propulsion mode or a transition between two propulsion modes wherein M is the number of propulsion modes;
$\theta_{ref}$ being the integral relative to a time of rotation speed setpoint of said drive wheels;
wherein N and Kij, i∈{1, . . . , R'} are gains ensuring stability, robustness and performance of said system and the transition between said two propulsion modes, wherein R' is a number of gains.

3. The method as claimed in claim 1, wherein the angle of deviation is determined from a value of an angle of inclination measured by a gyroscope mechanically secured to said wheelchair, wherein the angle of deviation is a difference between the value of the angle of inclination measured by the gyroscope and an estimated value of an inclination angle in the inclined position of equilibrium, said estimated value of the inclination angle in the inclined position of equilibrium being a function of geometrical and dynamic parameters of said wheelchair.

4. An electric propulsion kit for kiting out a rolling system comprising at least three wheels including two drive wheels, wherein the rolling system is in stable position when the rolling system rests on said at least three wheels, wherein the electric propulsion kit comprises at least:
two rotational drive motors, wherein each rotational drive motor is configured to be fixed to a drive wheel;
a gyroscope configured to measure an angle of inclination of said rolling system;

a central processing unit configured to deliver an output signal for controlling a value of a voltage applied to each rotational drive motor, wherein said central processing unit comprises a computer configured to implement a non-linear model of the rolling system defined with respect to at least two propulsion modes comprising a first propulsion mode in which the rolling system is propelled on all wheels in contact with the ground and a second propulsion mode in which the rolling system is in motion on the two drive wheels in an inclined position of equilibrium; and apply an automatic control by which a value of a voltage applied to each rotational drive motor is automatically controlled by using said non-linear model to perform a gyroscopic stabilization of said rolling system when the rolling system is in the second propulsion mode, a control interface configured to generate a control signal for activating the second propulsion mode and a control signal for deactivating the second propulsion mode;

wherein the non-linear model is defined for a system comprising a wheelchair and the rotational drive motors by the following equation:

$$\dot{x}(t) = \sum_{i=1}^{Q} h_i(z(t))[A_i x(t) + B_i u(t)]$$

$$y(t) = \sum_{i=1}^{Q} h_i(z(t)) C_i x(t)$$

in which x is a state vector such that:

$$x = [\theta \psi \dot{\theta} \dot{\psi}]^T$$

z (t) being dependent, linearly or not, on the state vector x and/or on external parameters;

y (t) representing outputs to be controlled;

u being a control input influencing components of the state vector x;

θ being equal to ½ ($\theta_R + \theta_L$), $\theta_R$ and $\theta_L$ being respectively angles of rotation of a right wheel and of a left wheel relative to a given origin;

ψ: being an angle of deviation of the wheelchair relative to a position of equilibrium $\psi_0$;

functions $h_i$(z(t) and matrixes $A_i$, $B_i$, i∈{1, . . . , R} depending on geometrical and mechanical parameters of said system, wherein a number Q is a number of non-linearities taken into account in the model, wherein the control input u represents the voltage applied to each rotational drive motor.

5. The electric propulsion kit as claimed in claim 4, wherein, based on information for deactivating said automatic control, the central processing unit is configured to generate values of the voltages applied to each rotational drive motor so as to create an acceleration of the drive wheels backward for a determined time, forcing the wheelchair to tilt forward and to rest on a front wheel.

6. The electric propulsion kit as claimed in claim 5, wherein the control interface is of a joystick type.

7. The electric propulsion kit as claimed in claim 5, wherein the control interface is a screen configured to navigate in a menu.

8. The electric propulsion kit as claimed in claim 4, wherein the gyroscope is configured to sense a backward tilting motion of the rolling system and wherein the control signal for activating said automatic control of the second propulsion mode is generated upon sensing by the gyroscope of the backward tilting motion.

9. The electric propulsion kit as claimed in claim 4, wherein the gyroscope is configured to sense a forward tilting motion of the rolling system and wherein the control signal for deactivating said automatic control of the second propulsion mode is generated upon sensing by the gyroscope of the forward tilting motion.

10. The electric propulsion kit as claimed in claim 4, wherein said rolling system is a wheelchair.

11. An electric wheelchair comprising at least three wheels, wherein said at least three wheels comprises two drive wheels, wherein each drive wheel is driven by an electric motor, the electric wheelchair comprising at least:

a gyroscope for measuring an angle of inclination of said wheelchair;

a central processing unit delivering an output signal for controlling a value of a voltage applied to each rotational drive motors, wherein said central processing unit comprises a computer configured to implement a non-linear model of the electric wheelchair defined with respect to at least two propulsion modes comprising a first propulsion mode in which the electric wheelchair is propelled on all wheels in contact with the ground and a second propulsion mode in which the electric wheelchair is in motion on the two drive wheels in an inclined position of equilibrium; and apply an automatic control by which the value of the voltage applied to each rotational drive motor is automatically controlled by using the non-linear model to perform a gyroscopic stabilization of the electric wheelchair when the electric wheelchair is in the second propulsion mode;

a control interface configured to generate a control signal for activating said automatic control of the second propulsion mode and a control signal for deactivating said automatic control of the second propulsion mode;

wherein the non-linear model is defined for a system comprising the electric wheelchair and the rotational drive motors by the following equation:

$$\dot{x}(t) = \sum_{i=1}^{Q} h_i(z(t))[A_i x(t) + B_i u(t)]$$

$$y(t) = \sum_{i=1}^{Q} h_i(z(t)) C_i x(t)$$

in which x is a state vector such that:

$$x = [\theta \psi \dot{\theta} \dot{\psi}]^T$$

z (t) being dependent, linearly or not, on the state vector x and/or on external parameters;

y (t) representing outputs to be controlled;

u being a control input influencing components of the state vector x;

θ being equal to ½ ($\theta_R + \theta_L$), $\theta_R$ and $\theta_L$ being respectively angles of rotation of a right wheel and of a left wheel relative to a given origin;

ψ: being an angle of deviation of the wheelchair relative to a position of equilibrium $\psi_0$;

functions $h_i$(z(t)) and matrixes $A_i$, $B_i$, i∈{1, . . . , R} depending on geometrical and mechanical parameters of said system, wherein a number Q is a number of non-linearities taken into account in the model,
wherein the control input u represents the voltage applied to each rotational drive motor.

12. The electric wheelchair as claimed in claim 11, wherein, on the basis of the control signal for deactivating said second propulsion mode, the central processing unit is configured to generate values of the voltage applied to each rotational drive motor so as to create an acceleration of the drive wheels backward for a determined time, forcing the electric wheelchair to tilt forward and to rest on a front wheel.

13. The electric wheelchair as claimed in claim 11, wherein the control interface is of a joystick type.

14. The electric wheelchair as claimed in claim 11, wherein the control interface is a screen configured to navigate in a menu.

15. The electric wheelchair as claimed in claim 11, wherein the control signal for activating said automatic control of the second propulsion mode is generated upon sensing by the gyroscope of a backward tilting motion of said electric wheelchair.

16. The electric wheelchair as claimed in claim 11, wherein the control signal for deactivating said automatic control of the second propulsion mode is generated upon sensing by the gyroscope of a forward tilting motion of said electric wheelchair.

* * * * *